United States Patent [19]
Honda et al.

[11] Patent Number: 5,432,212
[45] Date of Patent: Jul. 11, 1995

[54] DISPERSANT COMPOSITION FOR CEMENT HAVING EXCELLENT PROPERTY IN INHIBITION OF SLUMP-LOSS

[75] Inventors: Susumu Honda, Tokyo; Tadashi Hara, Chiba; Hideo Koyata, Kanagawa, all of Japan

[73] Assignee: W. R. Grace & Co.-Conn., New York, N.Y.

[21] Appl. No.: 222,152

[22] Filed: Apr. 4, 1994

[30] Foreign Application Priority Data

Apr. 5, 1993 [JP] Japan .................................. 5-078024

[51] Int. Cl.$^6$ ..................... C08K 3/00; C08F 222/06; C08F 220/64
[52] U.S. Cl. .......................................... 524/4; 106/823; 524/5; 524/6; 524/8; 526/271; 526/318.3
[58] Field of Search ................. 526/271, 318.3; 424/4, 424/5, 8, 6; 106/823

[56] References Cited

U.S. PATENT DOCUMENTS

| | | | |
|---|---|---|---|
| 4,946,904 | 8/1990 | Akimoto et al. | 524/5 |
| 4,946,918 | 8/1990 | Akigama et al. | 526/271 |
| 5,142,036 | 8/1992 | Akimoto et al. | 526/271 |
| 5,162,402 | 11/1992 | Ogawa et al. | 524/5 |
| 5,223,036 | 1/1993 | Koyata et al. | 106/823 |

*Primary Examiner*—Peter A. Szekely
*Attorney, Agent, or Firm*—Howard J. Troffkin

[57] ABSTRACT

A cement admixture which when added to a cement composition, such as cement mortar or concrete inhibits slump-loss of the cement composition and improve its workability and applicability. The admixture is composed of copolymers from an alkenyl ether, a polyalkenyl ether and maleic anhydride.

20 Claims, No Drawings

DISPERSANT COMPOSITION FOR CEMENT HAVING EXCELLENT PROPERTY IN INHIBITION OF SLUMP-LOSS

BACKGROUND OF THE INVENTION

The present invention relates to a cement admixture composition. More particularly, it relates to an admixture composition for hydraulic cement compositions such as mortar and concrete to prevent time wise decrease in their flowability (herein called as "slump loss") while drastically improving the compositions workability and applicability over sustained periods of time.

Slump loss is a major problem in the concrete industry. It is highly desired to have a cement additive which will impart high degree of flowability over an extended period of time while not imparting any significant set retardation to the cement composition. Various proposals have been made to solve this problem but, such proposals have not provided a combination of the desired characteristics or only provide the desired characteristics in low degrees.

Slump-loss is the biggest problem in concrete industry, and various methods have been tried by many investigators to solve this problem, but satisfactory solution has not been found so far. Therefore, there is a strong desire to find an early solution to this problem.

It is generally known, for example, that the copolymers of alkenyl ethers and maleic anhydride and the derivatives thereof can be employed as cement additives to improve slump loss [Japanese Patent Publication (Kokai) Nos. 63-285140(1988) and 2-163108(1990)]. However, copolymers of this class which have been previously used, exhibit only small improvement in slump loss or caused excessive set retardation to the treated cement composition.

It has now been found that certain copolymer compositions described below having a specified molecular structure have remarkable effectiveness for the prevention of slump loss without causing significant set retardation.

SUMMARY OF THE INVENTION

The present invention is directed to a cement admixture composition which requires the use of certain alkenyl ether/polyalkenyl ether/maleic anhydride copolymers.

The specific cement admixture compositions of this invention are alkenyl ether/polyalkenyl ether/maleic anhydride copolymer and mixtures thereof, as fully described below. They have been unexpectedly found to impart a high degree of slump loss over a sustained period of time, dramatically improving workability and applicability while not imparting any significant set retardation to the treated composition.

DETAILED DESCRIPTION

The present invention is directed to a cement admixture which has been unexpectedly found to provide a high flowability to cement compositions such as concrete and cement mortar, provide the high flowability over an extended period of time without imparting a significant delay in the curing (set) of the cement composition. This combination of properties has been unexpectedly achieved with the presently described cement admixture compositions.

The admixture composition of this invention is a novel composition for cement which has been unexpectedly found to impart the highly desired property of inhibition of slump-loss. The composition may be composed of one or more copolymer(s) of an alkenyl ether represented by the general formula (I),

$$R^1O(A^1O)_mR^2 \quad (I)$$

wherein, $A^1O$ is one, or a mixture of two or more oxyalkylene group, each having 2 or 3 carbon atoms, said groups, which may be added in block or random fashion;
$R^1$ is an alkenyl group having 2 to 5 carbons;
$R^2$ is an alkyl group having 1 to 4 carbons; and
m is an average number of adduct mols of the oxyalkylene groups of from 20 to 150, a polyalkenyl ether represented by the general formula (II),

$$Z[O(A^2O)_nR^3]_a \quad (II)$$

wherein Z is a residual group of a compound having 2 to 8 hydroxyl groups;
$A^2O$ is one, or a mixture of two or more oxyalkylene groups, each having 2 or 3 carbon atoms, said groups may be added in block or random fashion;
$R^3$ is an alkenyl group having 2 to 5 carbons, n is an average number of adduct mols of the oxyalkylene groups having a value of 1 to 100; and;
a has a value of 2 to 8.

and maleic anhydride, as the anhydride, its hydrolysis products, or salts of the hydrolysis products.

The ratio of equivalency of copolymerizable double bonds of the compound represented by the general formula (I) and the compound represented by the general formula (II) is 99:1–60:40, the ratio of equivalency of the sum of the compound represented by the general formula (I) and the compound represented by the general formula (II) to maleic anhydride is 30:70–70:30. The weight average molecular weight of said copolymer(s) is from 2,000 to 1,000,000.

The copolymers of this invention, their hydrolysis products, or the salts of said hydrolysis products, unlike conventional dispersants for cement, do not show decrease of flowability with respect to time. In many instances, treated cement compositions increase in flowability. Therefore, it can allow production of concrete having excellent property in inhibition of slump-loss when used alone. The present admixture can be also used in combination with existing cement dispersants.

In addition, the admixtures of the present invention do not retard setting nor cause a decrease in the strength after curing of cement composition which have been so treated.

In the above-described general formula (I) and the above-described general formula (II), the alkenyl groups having 2-5 carbons represented by $R^1$ and $R^3$, respectively, include, for example, vinyl, allyl, methallyl 1,1-dimethyl-2-propenyl, and 3-methyl-3-butenyl groups and the like. The allyl group is most preferred.

In above-described general formula (I) and above-described general formula (II), the oxyalkylene group having 2–3 carbons represented by $A^1O$ and $A^2O$, respectively, include, for example, oxyethylene and oxypropylene groups with oxyethylene group being most preferred.

In above-described general formula (I), the alkyl group having 1–4 carbons represented by $R^2$ may be selected for example, from methyl, ethyl, propyl, isopropyl, butyl, isobutyl, and tertiary butyl groups and the like. When the alkyl group has more than four carbon atoms, the amount of air entrainment in the treated mortar or concrete composition is increased. Therefore, it is desirable to select an alkyl group having 1 to 4 carbons if low air entrainment is desired.

The average number of adduct mols (m) of oxyalkylene group with respect to the above-described general formula (I), can be chosen from 20–150. Generally, as the value for m increases, one obtains a lower delay of setting and a higher effect in increasing the slump with time. It is preferred to select the m value from 30–120.

Examples of compounds providing the residual group (Z) containing 2–8 hydroxyl groups with respect to the above-described general formula (II) are polyvalent phenols, such as catechol, resorcinol, hydroquinone, phloroglucin and the like; polyvalent alcohols, such as ethyleneglycol, propyleneglycol, butyleneglycol, dodecyleneglycol, octadecyleneglycol, neopentylglycol, styreneglycol, glycerin, diglycerin, polyglycerin, trimethylolethane, trimethylolpropane, 1,3,5-pentanetriol, erythritol, pentaerythritol, dipentaerythritol, sorbitol, sorbitan, solbide, sorbitol/glycerin condensation products, adonitol, arabitol, xylitol, mannitol and the like; sugars such as xylose, arabinose, ribose, rhamnose, glucose, fructose, glactose, mannose, sorbose, cellobiose, maltose, isomaltose, trehalose, raffinose, sucrose, gentianose, melecitose, and the like; and esterified or partially esterified products thereof.

The average number of adduct mols (n) of the oxyalkylene group added as shown in the above-described general formula (II) can be selected from 1 to 1,000. Generally, copolymers having components with higher n values tend to increase the viscosity of the copolymer during its production while providing only minor slump-improving property with respect to increase in the value of n. Therefore, it is preferred to choose copolymers with n of from 1–200.

Ratio of equivalency of the copolymerizable double bonds of the compound represented by the general formula (I) and the compound represented by the general formula (II) may be selected from 99:1–60:40. To obtain a copolymer that has excellent slump-sustainability and slump-improving properties, it is important to control the average number of mols (m) of the oxyalkylene group in the general formula (I) and also the ratio of equivalency of the copolymerizable double bonds in the compound represented by the general formula (I) and the compound represented by the general formula (II). Generally, it is preferred that the larger the value of m in the general formula (I), the lower the amount of component represented by the general formula (I) in the resultant copolymer. On the other hand, when the value of m is small, it is preferred to utilize copolymers having higher amounts of component represented by the general formula (I)

Although excellent slump-sustaining properties can be achieved with the copolymer with sufficiently large m value in the general formula (I) and obtained without using a large amount of component of the general formula (II), production of such co-polymerization cannot be carried out easily.

In contrast, copolymers containing component of the general formula (I) and component of the general formula (II) which can achieve a high level of slump sustainability are readily produced and, therefore, the desired property can be readily obtained by the present invention.

The copolymer is characterized by having the capability of improving initial slump of the cement composition and also increasing the slump with time. The particular mode of application of the copolymer is not critical and can be decided by those skilled in the art depending on the types of cement or aggregates being used, whether applied by itself, or by combining it with other cement admixtures.

Cement admixtures that can be used in combination with the subject copolymer include conventional cement dispersants, such as naphthalene sulfonic acid/formaldehyde condensates, sulfonated melamine resins, lignin sulfonic acid, aminosulfonic acid, hydroxycarboxylic acid, ethylenically unsaturated dicarboxylic anhydrides, copolymers of linear or cyclic olefins having 4–6 carbon atoms, polycarboxylic acid, and the like; and one, or a mixture of two or more copolymers of maleic anhydride and the component represented by the general formula (I), such as disclosed in Japanese Kokai Patent SHO 63-285140 (1988) or Japanese Kokai Patent HEI 2-163108 (1990), its hydrolysis products, or the salts of its hydrolysis products, and the like.

However, desired properties achievable by the present copolymer may not be highly exhibited when combined with certain conventional dispersants, especially when such dispersants are used in large amounts. If these aspects are taken into consideration, it is most desirable to combine the present copolymer used with the polycarboxylic acid cement dispersants, or with copolymers of maleic anhydride and the component represented by the general formula (I), as disclosed in Japanese Kokai Patent SHO 63-285140 (1988) and Japanese Kokai Patent HEI 2-163108 (1990), its hydrolysis products or the salts of its hydrolysis products. Such conventional dispersant combinations exhibit no or minor adverse effect on the presently achieved properties.

The cement admixture composition disclosed herein can be used together with other known cement additives, such as air entrainers, waterproofing agent, strength enhancers, curing accelerators, antifoam agents and the like may be added and used.

The copolymer of maleic anhydride and the component represented by the general formula (I) and the component represented by the general formula (II) can be formed easily by copolymerization using a peroxide catalyst. Ratio of the equivalency of copolymerizable double bonds of the copolymer is selected from 30:70–70:30, preferably 50:50. In certain cases, other copolymerizable components, such as styrene, α-olefin, or vinyl acetate and the like can be used to provide the total combined amount of such monomers is no more than 30 weight percent during preparation of the copolymer. Hydrolysis and partially hydrolysis products of the present copolymer are products which contain at least some maleic acid units which resulted from hydrolysis of the copolymerized maleic anhydride units.

Salts of the hydrolysis products of the copolymer are those formed from the salts of the maleic acid units, and alkali metal salts, such as lithium salts, sodium salts, potassium salts, alkaline earth metal salts, such as magnesium salts and calcium salts, as well as ammonium salts and organic amine salts.

Weight average molecular weight of the copolymer is selected from 2,000–1,000,000, and preferably from 10,000–100,000.

The cement admixture composition of this invention can be used in various types of cements such as ordinary Portland cement, high early strength cement, ultra high early strength cement, blast-furnace slag cement, moderate heat cement, fly ash cement, and sulfate-resisting cement and the like; as well as other water-curable materials, such as gypsum and the like.

The presently described co-polymer admixture can be added to the cement composition through various means. For example, the subject copolymer can be added directly to the hydraulic cement as part of the water forming the initial cement composition or to the final composition, just prior to use. The exact mode of application will be determined by the particular application.

The cement admixture composition of this invention shows a high flowability without causing any significant retardation to the set time of cement composition such as mortar or concrete. In addition, the present admixture composition provides excellent inhibition of slump-loss and, thereby, significantly improves workability of cement compositions used in construction or building-related works.

The cement admixture composition of the present invention can be used for a variety of application as, for example, a fluidizing agent for ready-mixed concrete, a high range AE water-reducing agent, or a high range water-reducing agent for production of secondary concrete products.

The following examples are given for illustrative purposes only and are not meant to be a limitation on the invention, as defined by the appended claims. All parts and percentages are by weight unless otherwise indicated.

Copolymers of maleic anhydride, component of the general formula (I), and component of the general formula (II) were prepared using the procedure disclosed in Japanese Kokai Patent HEI 2-297411 (1989), as shown by the following examples:

EXAMPLE I

The following ingredients were placed in a four-necked flask equipped with a condenser, a $N_2$ gas inflow tube, a thermometer and an agitating device. Copolymerization reaction was carried out by raising the temperature of the flask to 80°–90° C. while continuously agitating for 7 hours under a $N_2$ gas atmosphere.

| Alkenyl ether (polyoxyethylene monoallyl monomethyl ether; number of mols of ethylene oxide added = 33 mols) | 573.0 g |
| --- | --- |
| Dialkenyl ether (polyoxyethylene diallyl ether; number of mols of ethylenoxide added = 33 mols) | 55.5 g |
| Maleic anhydride | 43.9 g |
| Benzoyl peroxide | 4.5 g |
| Toluene | 104.8 g |

At the completion of the reaction, toluene was removed by distillation at 110° C. under a reduced pressure of about 10 mm Hg, to obtain a brown-colored copolymer which was a solid at room temperature [labeled Copolymer (a)].

EXAMPLE 2

The following ingredients were placed in a four-necked flask equipped with a condenser, a $N_2$ gas inflow tube, a thermometer and an agitating device. Copolymerization reaction was carried out by raising the temperature of the flask to 80°–90° C. while continuously agitating for 7 hours under a $N_2$ gas atmosphere.

| Alkenyl ether (polyoxyethylene monoallyl monomethyl ether; number of mols of ethylene oxide added = 33 mols) | 573.0 g |
| --- | --- |
| Dialkenyl ether (polyoxyethylene diallyl ether; number of mols of ethylene oxide added = 33 mols) | 102.4 g |
| Maleic anhydride | 49.8 g |
| Benzoyl peroxide | 5.2 g |
| Toluene | 112.6 g |

After the reaction, toluene was removed by distillation at 110° C. under a reduced pressure of about 10 mm Hg, to obtain a brown-colored copolymer which was a solid at room temperature [labeled Copolymer (b)].

EXAMPLE 3

The following ingredients were placed in a four-necked flask equipped with a condensor, a $N_2$ gas inflow tube, a thermometer and an agitating device, and polymerization reaction was carried out by raising the temperature of the flask to 90°–100° C. while continuously agitating for 3 hours under a $N_2$ gas atmosphere.

| Alkenyl ether (polyoxyethylene monoallyl monomethyl ether; number of mols of ethylene oxide added = 91 mols) | 800.0 g |
| --- | --- |
| Dialkenyl ether (polyoxyethylene diallyl ether; number of mols of ethylene oxide added = 33 mols) | 20.7 g |
| Maleic anhydride | 21.9 g |
| Tertiary Butytl peroxide-2-ethyl hexanoate | 4.8 g |
| Toluene | 136.8 g |

After the reaction, toluene was removed by distillation at 110° C. under a reduced pressure of about 10 mm Hg, to obtain a brown-colored copolymer which was a solid at room temperature [labeled Copolymer (c)].

EXAMPLE 4

The following ingredients were placed in a four-necked flask equipped with a condenser, a $N_2$ gas inflow tube, a thermometer and an agitating device, and copolymerization reaction was carried out by raising the temperature of the flask to 90°–100° C. while continuously agitating for 3 hours under a $N_2$ gas atmosphere.

| Alkenyl ether (polyoxyethylene monoallyl monomethyl ether; number of mols of ethylene oxide added = 115 mols) | 2500 g |
| --- | --- |
| Dialkenyl ether (polyoxyethylene diallyl ether; number of mols of ethylene oxide added = 33 mols) | 24.1 g |
| Maleic anhydride | 50.8 g |
| Benzoyl peroxide | 15.0 g |
| Toluene | 420.7 g |

After the reaction, toluene was removed by distillation at 110° C. under a reduced pressure of about 10 mm Hg, to obtain a brown-colored copolymer which was a solid at room temperature [labeled Copolymer (d)].

EXAMPLE 5

The following ingredients were placed in a four-necked flask equipped with a condenser, a $N_2$ gas inflow tube, a thermometer and an agitating device, and copolymerization reaction was carried out by raising the temperature of the flask to 90°–100° C. and continuously agitating for 3 hours under a $N_2$ gas atmosphere.

| | |
|---|---|
| Alkenyl ether (polyoxyethylene monoallyl monomethyl ether; number of mols of ethylene oxide added = 115 mols) | 2500 g |
| Dialkenyl ether (polyoxyethylene diallyl ether; number of mols of ethylene oxide added = 200 mols) | 138.3 g |
| Maleic anhydride | 50.8 g |
| Benzoyl peroxide | 15.0 g |
| Toluene | 439.7 g |

After the reaction, toluene was removed by distillation at 110° C. under a reduced pressure of about 10 mm Hg, to obtain a brown-colored copolymer which was a solid at room temperature [labeled Copolymer (e)].

EXAMPLE 6

The following ingredients were placed in a four-necked flask equipped with a condenser, a $N_2$ gas inflow tube, a thermometer and an agitating device, and copolymerization reaction was carried out by raising the temperature of the flask to 85°–90° C. and continuously agitating for 3 hours under a $N_2$ gas atmosphere.

| | |
|---|---|
| Alkenyl ether (polyoxyethylene monoallyl monobutyl ether; number of mols of ethylene oxide added = 57 mols; number of mols of propylene oxide added = 57 mols; by random addition) | 3400 g |
| Dialkenyl ether (polyoxyethylene diallyl ether; number of mols of ethylene oxide added = 33 mols) | 49.4 g |
| Maleic anhydride | 62.5 g |
| Azobisisobutyronitrile | 12.5 g |
| Toluene | 574.9 g |

After the reaction, toluene was removed by distillation at 110° C. under a reduced pressure of about 10 mm Hg, to obtain a brown-colored copolymer which was a solid at room temperature [labeled Copolymer (f)].

EXAMPLE 7

The following ingredients were placed in a four-necked flask equipped with a condenser, a $N_2$ gas inflow tube, a thermometer and an agitating device, and copolymerization reaction was carried out by raising the temperature of the flask to 75°–85° C. and continuously agitating for 3 hours under a $N_2$ gas atmosphere.

| | |
|---|---|
| Alkenyl ether (polyoxyethylene monomethyallyl monomethyl ether; number of mols of ethylene oxide added = 33 mols) | 3076 g |
| Trialkenyl ether (trimethallyl ether of glycerin ethylene oxide addition product; number of mols of ethylene oxide added = 33 mols) | 72.6 g |
| Maleic anhydride | 208.5 g |
| Azobisisobutyronitrile | 14.7 g |
| Toluene | 524.8 g |

After the reaction, toluene was removed by distillation at 110° C. under a reduced pressure of about 10 mm Hg, to obtain a brown-colored copolymer which was a solid at room temperature [labeled Copolymer (g)].

Each of the copolymers were analyzed and the determined description of each copolymer is given in Table 1 below.

TABLE 1

| Copolymer | Compound of the general formula (I) | Compound of the general formula (II) |
|---|---|---|
| (a) | $CH_2=CHCH_2O(CH_2CH_2O)_{33}CH_3$ | $CH_2=CHCH_2O(CH_2CH_2O)_{33}CH_2CH=CH_2$ |
| (b) | $CH_2=CHCH_2O(CH_2CH_2O)_{33}CH_3$ | $CH_2=CHCH_2O(CH_2CH_2O)_{33}CH_2CH=CH_2$ |
| (c) | $CH_2=CHCH_2O(CH_2CH_2O)_{91}CH_3$ | $CH_2=CHCH_2O(CH_2CH_2O)_{33}CH_2CH=CH_2$ |
| (d) | $CH_2=CHCH_2O(CH_2CH_2O)_{115}CH_3$ | $CH_2=CHCH_2O(CH_2CH_2O)_{33}CH_2CH=CH_2$ |
| (e) | $CH_2=CHCH_2O(CH_2CH_2O)_{115}CH_3$ | $CH_2=CHCH_2O(CH_2CH_2O)_{200}CH_2CH=CH_2$ |
| (f) | $CH_2=CHCH_2O(CH_2CH_2O)_{57}(CH_2CHO)_{57}C_4H_9\ ^{1)}$ with pendant $CH_3$ | $CH_2=CHCH_2O(CH_2CH_2O)_{33}CH_2CH=CH_2$ |
| (g) | $CH_2=C(CH_3)CH_2O(CH_2CH_2O)_{33}CH_3$ | $CH_2=C(CH_3)CH_2O(CH_2CH_2O)_{11}CH_2CHCH_2O(CH_2CH_2O)_{11}CH_2C(CH_3)=CH_2$ with branch $O(CH_2CH_2O)_{11}CH_2C(CH_3)=CH_2$ |

| Copolymer | Weight average molecular weight | Equivalent ratio of copolymerizable double bonds in compound (I) and compound (II) |
|---|---|---|
| (a) | 43,000 | 84/16 |
| (b) | 78,000 | 74/26 |
| (c) | 53,000 | 88/12 |
| (d) | 62,000 | 94/6 |
| (e) | 68,000 | 94/6 |
| (f) | 82,000 | 90/10 |
| (g) | 97,000 | 94/6 |

EXAMPLES 8–17

PREPARATION OF CONCRETE COMPOSITION

Based on the formula illustrated in Table 2 below, 40 liters of concrete compositions and cement admixture agent, as shown in Table 3 below were added in a 50 liter capacity forced blending mixer, and they were blended for 90 seconds to prepare a fluidized concrete that had slump of 18 cm and air content of 4–5% (an air entrainer agent AEA available from Denka-Grace K. K. was used to bring the air content to the target level).

After blending was completed, the blend was discharged into a blending boat and it was worked over several times. Change of slump and air content with time was determined immediately after blending, 30 minutes later and 60 minutes later. Method for testing slump, air content, setting time, and compression strength, and method of preparation of test sample for testing the compression strength were based on JIS A6204. Results of the testing are presented in Table 4.

Comparative Examples 1–5

Following the procedure of Examples 8–17 described above, fluidizied concretes were prepared for comparison. The composition of each Comparative Example are given in Table 3 below and the results of Testing are presented in Table 4.

TABLE 2

| Type of concrete | W/C [%] | S/S + G [%] | Unit Amount [kg/m³] | | | |
|---|---|---|---|---|---|---|
| | | | C | W | S | G |
| Plain | 0.64 | 0.50 | 320 | 205 | 850 | 876 |
| Evaluation | 0.54 | 0.48 | 320 | 166 | 866 | 965 |

Materials used
Cement (C): Ordinary Portland cement (an equi-amount mixture of 3 brands; specific gravity = 3.16)
Water (W): Tap water
Fine aggregates (S): Sand from Ohi River in Japan (Specific Gravity = 2.60, Fineness Module = 2.76)
Coarse aggregates (G): Crushed stone produced at Oume in Tokyo (Specific gravity = 2.68; Fineness modulus = 6.60)

TABLE 3

| Group | Type of cement admixture agent | Amount added (wt. %, based on cement) |
|---|---|---|
| Example 8 | Copolymer (a) | 0.42 |
| Example 9 | Copolymer (b)/PC(a) | 0.30/0.10 |
| Example 10 | Copolymer (c)/PC(a) | 0.20/0.05 |
| Example 11 | Copolymer (c)/PC(b) | 0.20/0.07 |
| Example 12 | Copolymer (c)/LS | 0.20/0.15 |
| Example 13 | Copolymer (c)/NSFC | 0.20/0.20 |
| Example 14 | Copolymer (d)/PC(a) | 0.15/0.08 |
| Example 15 | Copolymer (e)/PC(a) | 0.13/0.09 |

TABLE 3-continued

| Group | Type of cement admixture agent | Amount added (wt. %, based on cement) |
|---|---|---|
| Example 16 | Copolymer (f)/PC(a) | 0.15/0.09 |
| Example 17 | Copolymer (g)/PC(a) | 0.15/0.15 |
| Comparative Ex. 1 | PC(a) | 0.19 |
| Comparative Ex. 2 | PC(b) | 0.23 |
| Comparative Ex. 3 | NSFC | 0.60 |
| Comparative Ex. 4 | LS | 0.60 |
| Comparative Ex. 5 | Copolymer (c) | 0.27 |

PC(a): Ratio of equivalency of the copolymerizable double bonds of the compound represented by the general formula (I) where $R^1$ is $CH_2=CHCH_2$ is $—CH_3$, $A^1O$ is $—C_2H_4O—$ and m is 33, and maleic anhydride is 1:1, and weight average molecular weight is 20,000. This is the Ca salt of the copolymer having such composition.
PC(b): Calcium polycarboxylate cement dispersant (commercial product)
NSFC: Calcium naphthalene sulfonate cement dispersant (commercial product)
LS: Calcium lignin sulfonate cement dispersant (commercial product)

TABLE 4

| Group | Immediately after | | 30 Minutes later | | 60 Minutes later | | Delay of setting (*3) [Minutes] | Compression strength after 28 days [kg/cm²] |
|---|---|---|---|---|---|---|---|---|
| | Slump [cm] | Air [%] | Slump [cm] | Air [%] | Slump cm | Air [%] | | |
| Example 8 | 18.0 | 4.6 | 18.0 | 4.4 | 17.0 | 4.2 | +85 | 422 |
| Example 9 | 18.5 | 4.3 | 18.0 | 4.3 | 17.5 | 4.0 | +80 | 425 |
| Example 10 | 18.0 | 4.2 | 19.0 | 4.2 | 18.5 | 4.1 | +45 | 438 |
| Example 11 | 18.5 | 4.6 | 19.0 | 4.4 | 18.0 | 4.2 | +55 | 433 |
| Example 12 | 18.5 | 4.2 | 18.0 | 4.4 | 17.0 | 4.4 | +80 | 415 |
| Example 13 | 19.0 | 4.7 | 18.0 | 4.3 | 17.0 | 4.1 | +60 | 418 |
| Example 14 | 18.0 | 4.1 | 19.0 | 4.2 | 18.5 | 4.3 | +45 | 435 |
| Example 15 | 17.5 | 4.3 | 19.0 | 4.1 | 19.0 | 4.1 | +40 | 440 |
| Example 16 | 18.0 | 4.5 | 18.5 | 4.4 | 18.0 | 4.5 | +50 | 428 |
| Example 17 | 18.5 | 4.4 | 19.0 | 4.6 | 18.5 | 4.3 | +65 | 435 |
| Comparative Ex. 1 | 18.5 | 4.3 | 14.5 | 4.5 | 12.0 | 4.3 | +80 | 422 |
| Comparative Ex. 2 | 19.0 | 4.5 | 16.0 | 4.5 | 11.5 | 4.2 | +85 | 418 |
| Comparative Ex. 3 | 18.5 | 4.8 | 14.5 | 4.4 | 8.5 | 3.9 | +30 | 422 |
| Comparative Ex. 4 | 18.5 | 4.3 | 16.5 | 4.6 | 11.0 | 4.5 | +105 | 408 |
| Comparative Ex. 5 | 18.0 | 4.2 | >25(4) | 2.2 | 23.5 | 2.8 | +40 | 440 |

3) Delay time, compared to plain concrete.
4) Segregation

What is claimed:

1. An admixture for cement compositions capable of enhancing slump and inhibiting slump-loss comprising at least one copolymer composed of a combination of an alkenyl ether represented by the general formula (I)

$$R^1O(A^1O)_mR^2 \quad (I)$$

wherein $A^1O$ is one or a mixture of oxyalkylene groups having 2 to 3 carbons;
$R^1$ is an alkenyl group having 2 to 5 carbons;
$R^2$ is an alkyl group having 1 to 4 carbons; and
m represents an average number of mols of the oxyalkylene groups and has a numerical value of from 20 to 150, a polyalkenyl ether represented by the general formula (II), $$Z[O(A^2O)_nR^3]_a \quad (II)$$

wherein Z is a residual group of a compound having 2 to 8 hydroxyl groups,
$A^2O$ is one or a mixture of oxyalkylene groups having 2 to 3 carbons;
$R^3$ is an alkenyl group having 2 to 5 carbons;
n represents an average number of mols of the oxyalkylene groups and has a numerical value of from 1 to 1000; and a has a value of 2 to 8, and maleic anhydride, its hydrolyzed product or salts of its hydrolyzed products, where the ratio of equivalency of copolymerizable double bonds of the component represented by the general formula (I) and the component represented by the general formula (II) is 99:1–60:40, the ratio of equivalency of the sum of the component represented by the general formula (I) and the component represented by the general formula (II) to maleic anhydride, its hydrolyzed product or salts thereof is 30:70–70:30; and the copolymer has a weight average molecular weight of from about 2,000–1,000,000.

2. The admixture of claim 1 wherein the group $A^1O$ and $A^2O$ each individually represent a mixture of oxyalkylene groups and are present in block or random configuration.

3. The admixture of claim 1 wherein one of the groups $A^1O$ and $A^2O$ each independently represents oxyethylene.

4. The admixture of claim 1 wherein one of the groups $A^1O$ and $A^2O$ each independently represents oxyethylene.

5. The admixture of claim 1 wherein the symbol m of the Formula I represents 30 to 120; and the symbol n of Formula II represents 1 to 200.

6. The admixture of claim 4 wherein the symbol m of the Formula I represents 30 to 120; and the symbol n of Formula II represents 1 to 200.

7. The admixture of claim 6 wherein the copolymer has a weight average molecular weight of from about 10,000 to 100,000.

8. The admixture of claim 1 wherein the admixture comprises a major amount of said copolymer in combination with a minor amount of a cement additive selected from the group consisting of dispersants, air entrainers, air detrainers, waterproofing agents, strength enhancers, curing accelerators and antifoam agents or mixtures thereof.

9. The admixture of claim 2 wherein the admixture comprises a major amount of said copolymer in combination with a minor amount of a cement additive selected from the group consisting of dispersants, air entrainers, air detrainers, waterproofing agents, strength enhancers, curing accelerators and antifoam agents or mixtures thereof.

10. The admixture of claim 3 wherein the admixture comprises a major amount of said copolymer in combination with a minor amount of a cement additive selected from the group consisting of dispersants, air entrainers, air detrainers, waterproofing agents, strength enhancers, curing accelerators and antifoam agents or mixtures thereof.

11. The admixture of claim 4 wherein the admixture comprises a major amount of said copolymer in combination with a minor amount of a cement additive selected from the group consisting of dispersants, air entrainers, air detrainers, waterproofing agents, strength enhancers, curing accelerators and antifoam agents or mixtures thereof.

12. The admixture of claim 5 wherein the admixture comprises a major amount of said copolymer in combination with a minor amount of a cement additive selected from the group consisting of dispersants, air entrainers, air detrainers, waterproofing agents, strength enhancers, curing accelerators and antifoam agents or mixtures thereof.

13. The admixture of claim 6 wherein the admixture comprises a major amount of said copolymer in combination with a minor amount of a cement additive selected from the group consisting of dispersants, air entrainers, air detrainers, waterproofing agents, strength enhancers, curing accelerators and antifoam agents or mixtures thereof.

14. The admixture of claim 7 wherein the admixture comprises a major amount of said copolymer in combination with a minor amount of a cement additive selected from the group consisting of dispersants, air entrainers, air detrainers, waterproofing agents, strength enhancers, curing accelerators and antifoam agents or mixtures thereof.

15. An improved cement composition capable of exhibiting an inhibition to slump loss with respect to time comprising a hydraulic cement, aggregate, water and the admixture of claim 1.

16. An improved cement composition capable of exhibiting an inhibition to slump loss with respect to time comprising a hydraulic cement, aggregate, water and the admixture of claim 2.

17. An improved cement composition capable of exhibiting an inhibition to slump loss with respect to time comprising a hydraulic cement, aggregate, water and the admixture of claim 4.

18. An improved cement composition capable of exhibiting an inhibition to slump loss with respect to time comprising a hydraulic cement, aggregate, water and the admixture of claim 6.

19. An improved cement composition capable of exhibiting an inhibition to slump loss with respect to time comprising a hydraulic cement, aggregate, water and the admixture of claim 8.

20. The improved cement composition of claim 15 wherein the aggregate is composed of sand and stone to form a concrete.

* * * * *